(12) United States Patent
Olaru et al.

(10) Patent No.: US 7,614,872 B2
(45) Date of Patent: Nov. 10, 2009

(54) MELT REDISTRIBUTION ELEMENT FOR AN INJECTION MOLDING APPARATUS

(75) Inventors: Gheorghe Olaru, Skaneateles, NY (US); Rhonda Goslinski, Guelph (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 246 days.

(21) Appl. No.: 11/242,038

(22) Filed: Oct. 4, 2005

(65) Prior Publication Data

US 2007/0077328 A1  Apr. 5, 2007

(51) Int. Cl.
*B29C 45/00* (2006.01)
*B29C 45/20* (2006.01)

(52) U.S. Cl. ............... 425/572; 425/573; 264/328.8; 264/328.12; 366/339; 366/340

(58) Field of Classification Search ............... 425/572, 425/573; 264/328.8, 328.12; 366/339, 338, 366/340, 80
See application file for complete search history.

(56) References Cited

U.S. PATENT DOCUMENTS

| | | | | |
|---|---|---|---|---|
| 3,635,444 | A | * | 1/1972 | Potter ............... 366/339 |
| 3,696,840 | A | | 10/1972 | Odhner |
| 4,027,857 | A | * | 6/1977 | Cunningham ............... 366/340 |
| 4,123,496 | A | | 10/1978 | Gallizia et al. |
| 4,292,018 | A | | 9/1981 | Beale |
| 4,299,553 | A | | 11/1981 | Swaroop |
| 4,303,382 | A | | 12/1981 | Gellert |
| 4,403,933 | A | | 9/1983 | Davis et al. |
| 4,443,178 | A | | 4/1984 | Fujita |
| 4,469,649 | A | | 9/1984 | Ibar |
| 4,781,879 | A | | 11/1988 | Oishi |

(Continued)

FOREIGN PATENT DOCUMENTS

CA  1165525  4/1984

(Continued)

OTHER PUBLICATIONS

Abraham D. Strook, *Microsystems, Microfluidic Transport, and Colloid Science*, published on Cornell University Website at <http://web1temp.cheme.cornell.edu/peopleevents/faculty/stroock/Research.htm>, date unknown.

(Continued)

*Primary Examiner*—Maria Veronica D Ewald
(74) *Attorney, Agent, or Firm*—Medler Ferro PLLC

(57) ABSTRACT

An injection molding apparatus having a manifold and several manifold melt channels communicating with several hot runner nozzles includes a melt redistribution element. The melt redistribution element is placed at specific locations along the melt channels to balance the uneven shear stress profile accumulated during the flow of a melt along the manifold channels. The melt redistribution element has an unobstructed central melt bore having at its inlet a narrowing tapered channel portion. The melt redistribution element also includes a helical melt pathway portion that surrounds the central melt bore. The incoming melt is first subjected to a pressure increase by the tapered portion that causes the melt to flow at a higher velocity through the central melt bore. The outer portion of the melt is forced to flow along the helical path and thus it changes direction multiple times and partially mixes with the melt flowing through the central melt bore. Accordingly, at the outlet of the melt redistribution element the shear stress profile is more evenly distributed than at the inlet of the redistribution element.

37 Claims, 14 Drawing Sheets

U.S. PATENT DOCUMENTS

| | | | |
|---|---|---|---|
| 4,848,920 A | 7/1989 | Heathe et al. | |
| 4,965,028 A | 10/1990 | Maus et al. | |
| 5,069,840 A | 12/1991 | Arnott | |
| 5,192,556 A | 3/1993 | Schmidt | |
| 5,262,119 A | 11/1993 | Smith | |
| 5,421,715 A | 6/1995 | Hofstetter et al. | |
| 5,554,395 A | 9/1996 | Hume et al. | |
| 5,605,400 A * | 2/1997 | Kojima | 366/339 |
| 5,683,731 A | 11/1997 | Deardurff et al. | |
| 5,688,462 A | 11/1997 | Salamon et al. | |
| 5,783,234 A | 7/1998 | Teng | |
| 5,916,605 A | 6/1999 | Swenson et al. | |
| 5,941,637 A | 8/1999 | Maurer | |
| 5,955,121 A | 9/1999 | Gellert et al. | |
| 6,077,470 A | 6/2000 | Beaumont | |
| 6,089,468 A | 7/2000 | Bouti | |
| 6,235,230 B1 | 5/2001 | Puniello | |
| 6,245,278 B1 | 6/2001 | Lausenhammer et al. | |
| 6,349,886 B1 | 2/2002 | Bouti | |
| 6,382,528 B1 | 5/2002 | Bouti | |
| 6,450,798 B1 | 9/2002 | Choi et al. | |
| 6,503,438 B2 | 1/2003 | Beaumont et al. | |
| 6,544,028 B2 | 4/2003 | Wright et al. | |
| 6,572,361 B2 | 6/2003 | Gould et al. | |
| 6,796,786 B2 * | 9/2004 | White et al. | 425/543 |
| 7,287,977 B2 | 10/2007 | Serniuck et al. | |
| 2002/0070288 A1 | 6/2002 | Bouti | |
| 2002/0086086 A1 | 7/2002 | Doyle et al. | |
| 2002/0149135 A1 | 10/2002 | Choi et al. | |
| 2004/0047943 A1 | 3/2004 | White et al. | |
| 2004/0130062 A1 | 7/2004 | Sicilia | |
| 2004/0164459 A1 | 8/2004 | Babin et al. | |
| 2004/0256768 A1 | 12/2004 | Olaru | |
| 2004/0265422 A1 | 12/2004 | Sabin et al. | |
| 2005/0238758 A1 | 10/2005 | Ciccone et al. | |

FOREIGN PATENT DOCUMENTS

| | | |
|---|---|---|
| DE | 20 17 710 A1 | 10/1970 |
| DE | 3201710 A1 | 8/1982 |
| EP | 0293756 A2 | 12/1988 |
| EP | 0293756 A3 | 12/1989 |
| EP | 0 779 140 A1 | 6/1997 |
| EP | 963829 A1 | 12/1999 |
| EP | 1140456 B1 | 10/2001 |
| JP | 2-178012 | 7/1990 |
| JP | 10-006363 A | 1/1998 |
| WO | WO 01/34365 A1 | 5/2001 |
| WO | WO 03/008173 A1 | 1/2003 |
| WO | WO 03/011443 A2 | 2/2003 |
| WO | WO-03/035 358 A1 | 5/2003 |

OTHER PUBLICATIONS

Document entitled *Efficient Spiral Flow 3-D Microchannel*, published at <http://www.shoji.comm.waseda.ac.jp/~mf/mfeg/Spiralflow.htm>, Shoji Laboratory, Waseda University, Japan, date unknown.

Abstract of *Nozzle Tip Handles Quick Colour Changes* from <www.tool-moldmaking.com>(Sep. 14, 2004), European Tool & Mould Making May/Jun. 2001, Husky Injection Molding Systems S.A.

News Release, Husky Injection Molding Systems Ltd., *Melt Mixing Technology Improves Part Quality*, Aug. 9, 2001.

Abstract of *Hot Runner Nozzle Increase Performance* from <www.tool-moldmaking.com>(Sep. 14, 2004), European Tool & Mould Making Oct. 2001, Husky Injection Molding Systems S.A.

Abstract of *When Mixing It Is a Good Idea* from <www.tool-moldmaking.com>(Sep. 14, 2004), European Tool & Mould Making Nov./Dec. 2001, Husky Injection Molding Systems S.A.

Abstract of *Stable Melt Profile Means Uniform Part Quality* from <www.tool-moldmaking.com>(Sep. 14, 2004), European Tool & Mould Making Jul./Aug. 2002, Husky Injection Molding Systems S.A.

News Release, Husky Injection Molding Systems Ltd., *Husky Introduces Ultraflow for Ultra Hot Runner Nozzles*, Jun. 23, 2003.

J. Blundy, *Improving Shear Induced Imbalance in Hot Runner Systems*, INCOE Corporation publication (Jun. 25, 2004).

News Release, Husky Injection Molding Systems Ltd., *New UltraFlow tip improves melt homogeneity and part quality*, Oct. 20, 2004.

Beaumont, John P., et al., "Solving Mold Filling Imbalances in Multi-cavity Injection Molds", *Journal of Injection Molding Technology*, (Jun. 1998, vol. 2, No. 2), 47-58.

Wright, Corin, "Improving Color Change in Hot Runner Molds", *Plastics Machinery & Auxiliaries*, (Apr. 2003).

\* cited by examiner

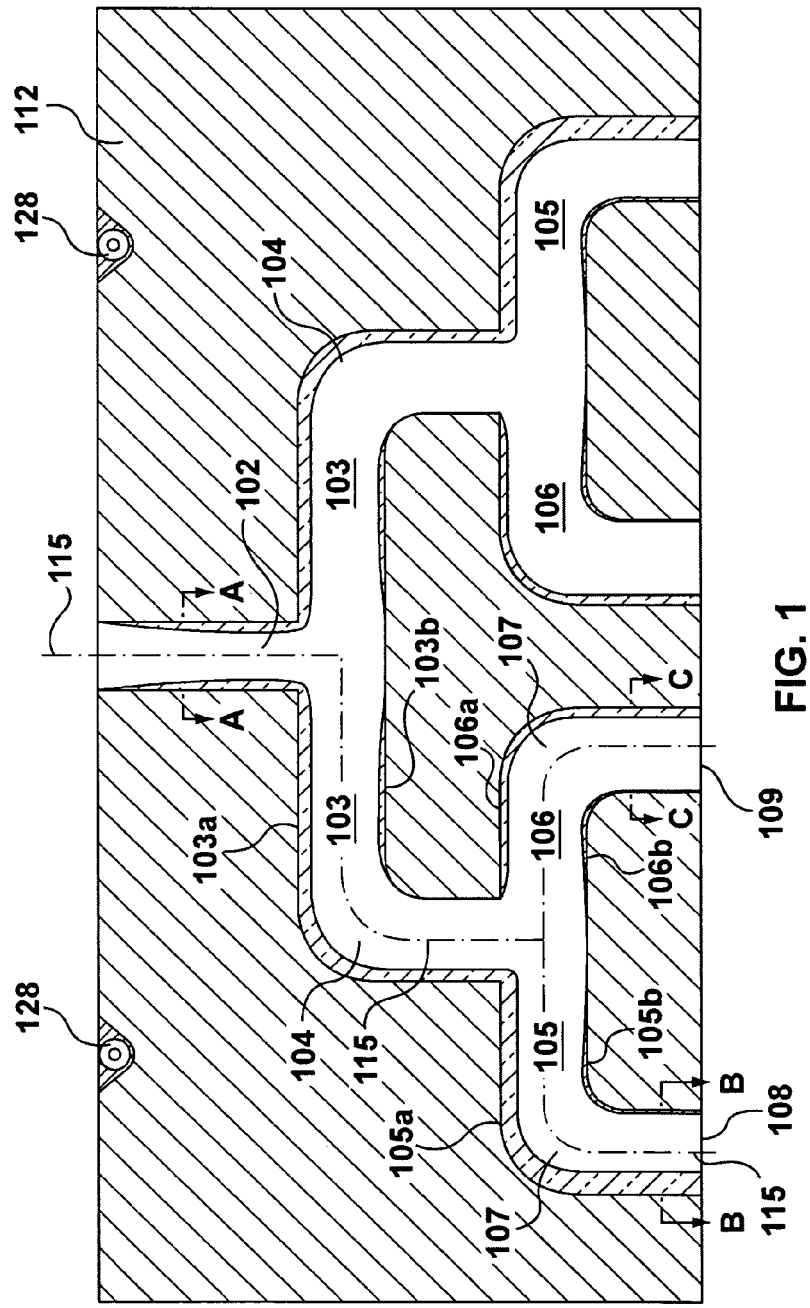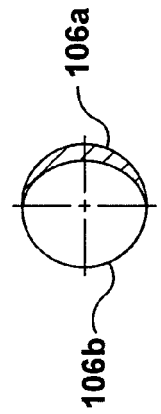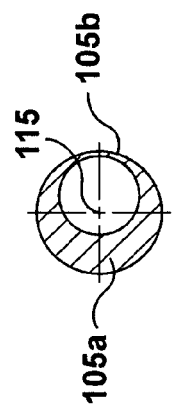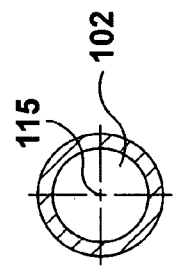

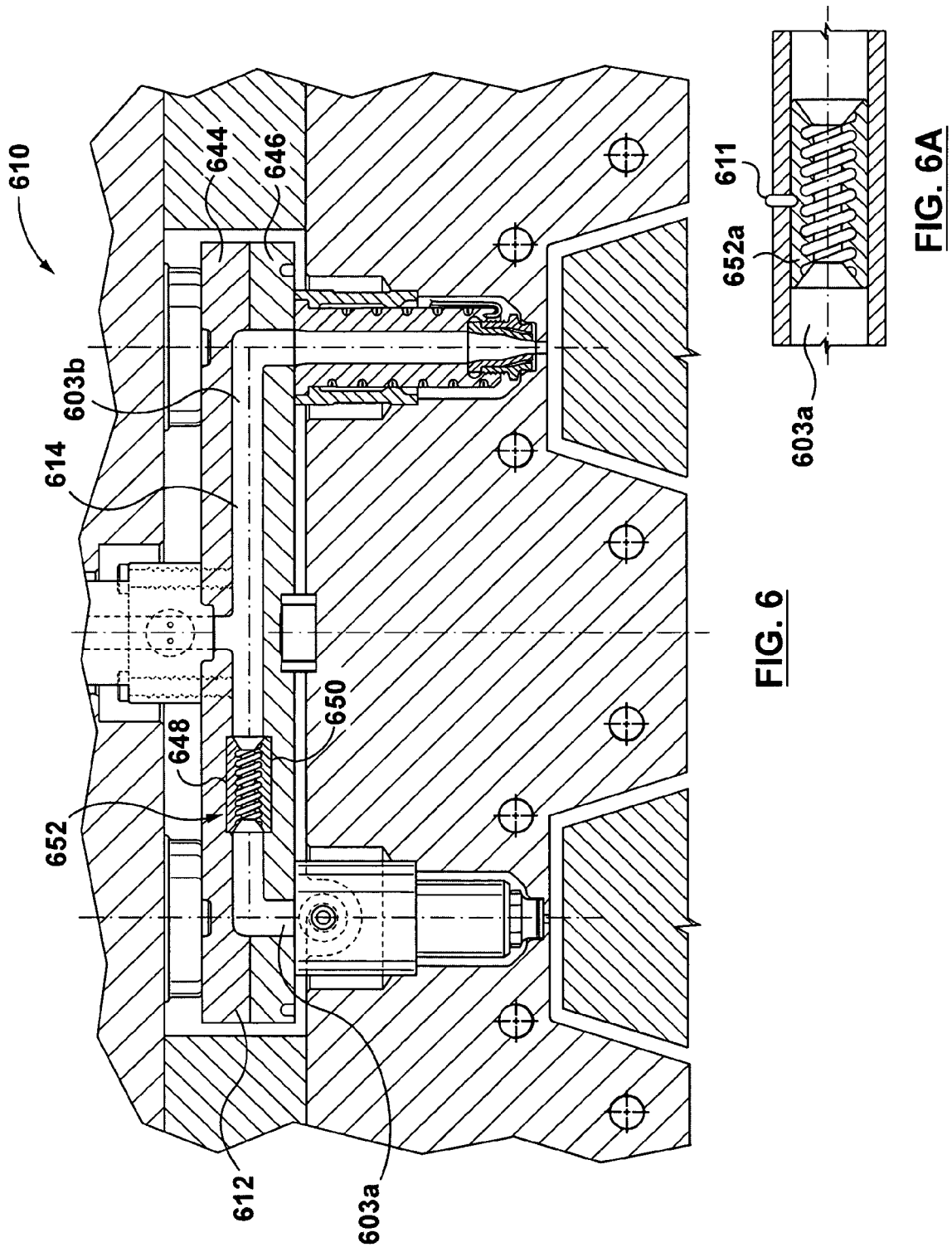

MELT REDISTRIBUTION ELEMENT FOR AN INJECTION MOLDING APPARATUS

FIELD OF THE INVENTION

The present invention relates generally to a melt redistribution element and method to improve the homogeneity of melt material in an injection molding hot runner apparatus.

BACKGROUND OF THE INVENTION

In a conventional injection molding apparatus, melt material is delivered from an injection molding machine and flows through a hot runner manifold generally having a plurality of circular cross-section manifold channels. The manifold has an inlet and a plurality of outlets communicating with a plurality of hot runner nozzles and is heated to maintain the melt at a consistent and flowable temperature. Several variables affect the quality of the molded parts produced using hot runner manifolds. One such variable is the shear stress-induced flow imbalance that can be observed or measured along the melt channels and at the outlets of the manifold. This flow imbalance is unavoidable and is characterized by a variable, non-symmetrical, cross-sectional distribution (or profile) of the temperature, viscosity and velocity of the melt along each melt channel of the manifold. Therefore, the temperature, viscosity and velocity cross-sectional distribution or profile of the melt leaving the manifold varies at the entrance of each nozzle. This explains why in many applications the molded parts differ from one cavity to the other and from one batch to the other in terms of weight, density, size, appearance, etc.

As the melt material flows in generally circular channels, the material in the center of the channel has a higher velocity than the material along the sides of the channel. Since material along the sides of the channel moves more slowly than material in the center, it is exposed to the heat from the manifold for a longer period of time than the faster, more centrally-disposed material causing a temperature imbalance between material in the middle of a channel and material along the sides of a channel. At the same time, melt material against the sides of a channel are further heated and stressed (i.e., sheared) by the friction generated as the melt moves against the side channels. Higher temperatures and shear stress create changes in viscosity of the material.

FIG. 1 shows, in cross-section, a conventional two-level hot runner manifold 112 of a multi-channel injection molding apparatus. Melt material enters the manifold along a channel 102. The melt is maintained at a moldable temperature by manifold heaters 128. The melt then splits and enters identical and opposite branches 103 and flows around a first approximately 90-degree turn 104. The melt then splits again and enters identical and opposite branches 105 and 106, curves around a second approximately 90-degree turn 107 in each branch and exits the manifold through outlets 108 and 109, respectively. The outlets 108 and 109 are in fluid communication with two hot runner nozzles (not shown) to deliver the melt to either a single or two mold cavity system (not shown).

The shear stress created along the walls of channel 102 is schematically shown in FIG. 1A in a cross-sectional shear profile along line A-A. When channel 102 splits into branches or melt channels 103, the shear stress from melt channel 102 is greater along side 103a than on side 103b of melt channels 103. As melt material flows through branch 103, shear stress is naturally created at a lesser extent along a side 103b. However, any shear stress formed by friction along side 103a is added to the shear history from channel 102 along side 103a, forming a side-to-side, or asymmetrical, shear stress profile imbalance within channel 103. Further, shear stress profile imbalance occurs as melt moves around turns 104 and further flows along melt channel 103. Where channel 103 splits into branches or melt channels 105 and 106, the shear stress and thus the temperature and velocity profile along and across these melt channels and towards outlets 108 and 109 becomes even more unevenly distributed and unevenly balanced. The variations of shear stress profile from side 105a to side 105b are shown schematically in a cross-sectional shear stress profile along line B-B, shown in FIG. 1B. Shear stress profile variations from side 106a to side 106b are generally shown in a cross-sectional shear profile along line C-C, shown in FIG. 1C. Thus, at manifold outlets 108 and 109 each of the cross-sectional shear stress profiles of FIGS. 1B and 1C indicate distinct side-to-side variations and thus uneven shear stress, temperature and viscosity cross-sectional distribution with respect to a central axis 115 of the manifold melt channels.

Further, comparison of cross-sectional shear profiles of FIGS. 1B and 1C indicates that the amount of shear stress between manifold channels 105 and 106 differs greatly. Since shear stress profiles are also an indication of temperature, velocity and viscosity profiles, the melt that leaves branch 105 through outlet 108 has a much higher temperature on the outer and intermediate portion of the melt than the melt material that leaves channel 106 through outlet 109. Thus, a temperature and pressure suitable for molding a product from the melt in branch 105 may be different from a temperature and pressure suitable for molding a product from the melt material in branch 106. Since it is very difficult to adjust or locally correct the temperature and pressure differences to a particular channel in a multi-channel injection molding apparatus, variations in shear stress profiles lead to inconsistent molded products from one mold cavity to another and from one batch of molded products to the next.

Further, side-to-side (or uneven or non-symmetrical) shear stress and temperature cross-sectional profiles may cause different flow characteristics from one side to the other of a single molded product, causing poor quality parts to be produced.

Attempts have been made to either reduce, eliminate, redistribute or rotate the non-symmetrical profile of the temperature, viscosity or velocity of the melt flowing inside a manifold towards several nozzles in order to provide at the manifold outlets more homogeneous, identical or similar profiles that would improve the processing conditions. However, these attempts generally require splitting the melt stream via a mechanical obstruction, which may lead to flow lines, particularly with materials that are sensitive to the development of flow lines.

Reference is made in this regard to European Patent Publication No. EP 0293756, U.S. Pat. No. 5,421,715 and U.S. Pat. No. 6,572,361 that show so-called manifold melt mixers, U.S. Pat. No. 5,683,731 that shows one so-called manifold melt redistributor and U.S. Pat. No. 6,077,470 that shows a so-called melt flipper, or melt rotating device. Further, reference is also made to U.S. Patent Application Publication No. 2004/0130062 that shows yet another melt mixing device and method. Each of these references is incorporated by reference herein in its entirety, respectively.

There is a need to provide a melt redistribution device and method that will provide a melt flow through a hot runner system with an improved temperature, viscosity, pressure and shear stress cross-sectional profile at various stages of the melt flow through the system.

SUMMARY OF THE INVENTION

This invention discloses an injection molding apparatus and an injection molding method that provides a molten material having more symmetrical shear stress, temperature, viscosity and velocity cross-sectional profiles at each of a plurality of outlets of an injection manifold.

According to one embodiment of the invention, a melt redistribution element is placed at specific locations inside an injection manifold along the melt channels. The melt redistribution element is provided with an unobstructed melt bore having at its inlet an inlet tapered section that increases the melt's pressure and generates a pressure increase, or what is known in the injection molding trade as a pressure drop. The melt redistribution element further includes a helical melt pathway that surrounds the melt bore. The incoming melt, flowing along the manifold melt channel and having accumulated an uneven shear stress profile, is first subjected to the pressure increase that causes the melt to flow at a higher velocity through the central melt bore of the melt redistribution element. Next, a central portion of the melt stream continues to flow along the melt bore and an outer portion of the melt stream flows along the helical melt pathway. Initially, the outer portion has a more non-symmetrical shear stress profile than the central portion. The helical melt pathway changes the direction of flow of the outer portion of the melt stream to reorient the shear stress and to mix some of the outer portion of the melt stream with some of the adjacent central portion of the melt stream. At the outlet of the melt redistribution element, the shear stress cross-sectional profile of the melt is more even, or symmetrical, than at the inlet.

In another embodiment of the invention, the melt redistribution element has several helical melt pathways, which may provide an additional reorientation and mix of the outer portion of the melt stream, further improving the shear stress cross-sectional profile at the outlet of the melt redistribution element.

By directing the melt directly through a melt redistribution element without using a blocking, or splitting, mechanical device inside the melt bore, the melt redistribution element according to this invention works as a non-invasive device reducing the occurrence of flow lines, for example.

One aspect of the present invention is directed towards having a more consistent shear stress cross-sectional profile of the melt material exiting each of a plurality of manifold channel outlets within a multi-channel injection molding apparatus.

Another aspect of the invention is to have a melt material with a more uniform shear stress cross-sectional profile when exiting a particular outlet of a manifold channel of an injection molding apparatus. In each case, an unobstructed melt redistribution element is used that does not require the mechanical separation of an incoming melt stream.

According to an embodiment of the present invention, there is provided an injection molding apparatus including a manifold having a manifold channel with an inlet for receiving a melt stream of moldable material under pressure and a plurality of outlets, a melt redistribution element having an inlet and an outlet communicating with the manifold channel, and a plurality of nozzles each having a nozzle channel for receiving the melt stream from the outlet of the manifold channel.

The melt redistribution element has an unobstructed melt bore that is further provided with a melt bore surface having a helical melt pathway. The incoming melt stream is first subjected to a pressure increase, alternatively referred to as a pressure drop, and then flows through the melt bore of the melt redistribution element and through the helical melt pathway.

According to another embodiment of the invention, the melt redistributing method includes providing a melt redistribution element that: a) provides a non-invasive local pressure increase of the melt by reducing the diameter of the manifold melt channel at the inlet and b) provides a non-invasive melt splitting and redirection of the melt stream by allowing a central portion of the pressurized melt to continue to follow a straight pathway and forcing an outer portion of the melt stream to follow a helical melt pathway. A certain degree of mixing between the central portion of the melt stream and the outer portion of the melt stream may occur while the melt flows through the melt redistribution element. The degree of mixing depends of various factors and variables such as the level, or the amount, of the pressure increase, the length of the melt redistribution element's melt bore and the helical melt pathway, the pitch or the density of the helical pathway and the viscosity and the temperature of the melt. More mixing and better homogenizing is achieved with some molten materials when the melt redistribution element has more than one helical melt pathway.

BRIEF DESCRIPTION OF THE FIGURES

Embodiments of the present invention will now be described more fully with reference to the accompanying drawings in which like reference numerals indicate similar structure.

FIG. 1 is a side view partly in section of a conventional multi-channel manifold of an injection molding apparatus.

FIG. 1A is a cross-sectional shear profile taken along a line A-A in FIG. 1; FIG. 1B is a cross-sectional shear profile taken along a line B-B in FIG. 1; and FIG. 1C is a cross-sectional shear profile taken along a line C-C in FIG. 1.

FIG. 6 is a side sectional view of another embodiment of an injection molding apparatus according to the present invention. FIG. 6A is a side sectional view of a portion of another embodiment of injection molding apparatus according to the present invention.

DETAILED DESCRIPTION OF THE INVENTION

Figure 2:
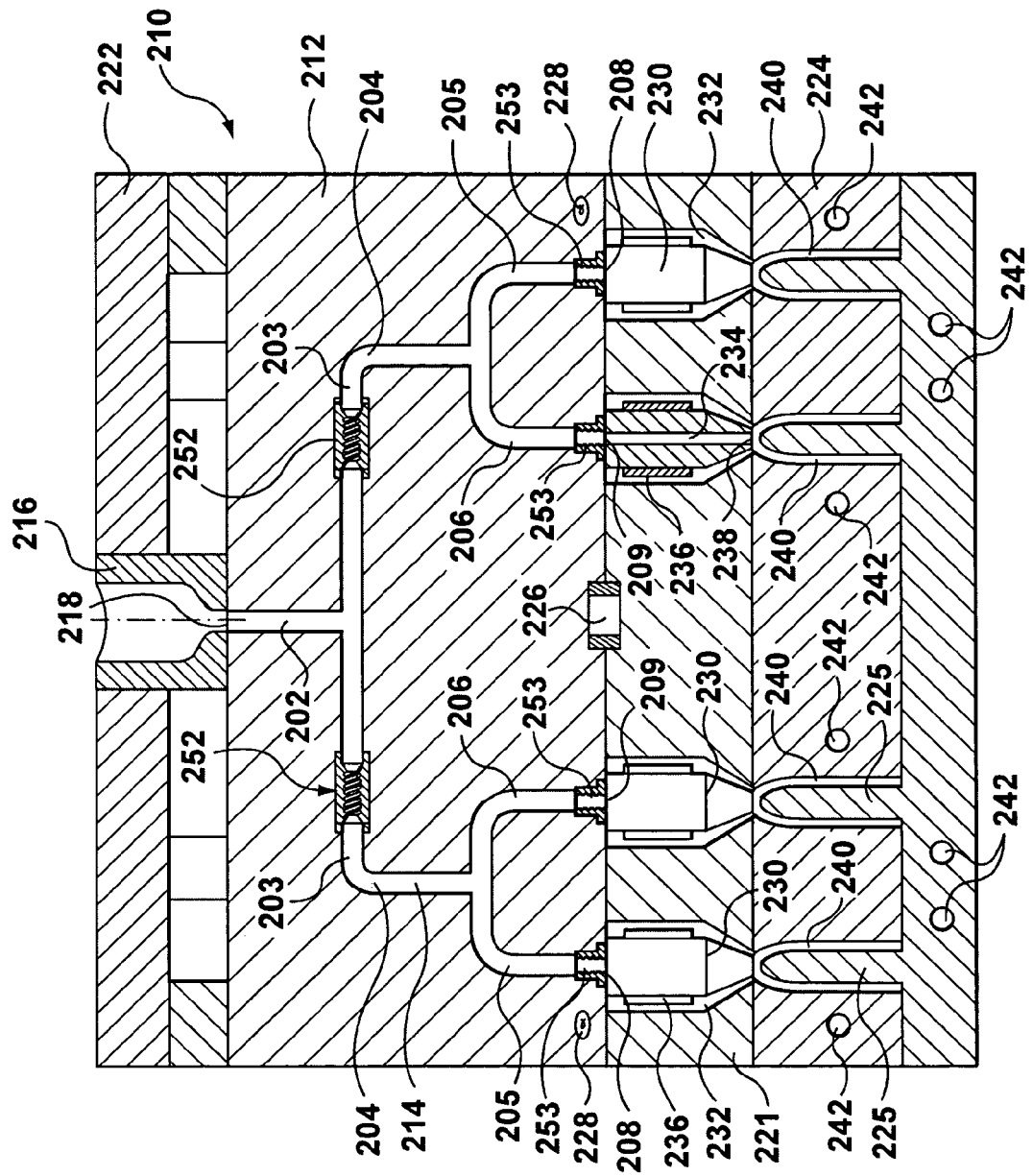
FIG. 2 is a side sectional view of an embodiment of an injection molding apparatus according to the present invention.

Referring now to FIG. 2, an injection molding apparatus according to an embodiment of the invention is generally shown at 210. Injection molding apparatus 210 includes a two level manifold 212 having manifold channels 214. As shown, manifold channels 214 are in communication with an inlet melt channel 202 that splits into at least two melt branches 203 downstream of a manifold inlet 218. Melt from channel 202 enters a melt redistribution element 252 within each branch 203. Melt redistribution element 252 will be discussed in further detail below, with respect to melt redistribution element 352 of FIG. 3. Each branch 203 turns a corner 204 and splits again into branches 205 and 206. Manifold 212 is spaced between a mold block back plate 222 and a cavity mold plate 224. Manifold 212 is located relative to the cavity mold plate 224 by a locating ring 226. A sprue bushing 216 is coupled to the manifold inlet 218. The sprue bushing 216 receives melt from a machine nozzle (not shown) and delivers the melt through manifold inlet 218 to channel 202 of manifold 212. The melt travels through branches 203, 205 and 206. Before exiting manifold 212 through outlets 208 and 209 of branches 205 and 206, respectively, melt travels again through melt redistribution elements 253. Melt redistribution element 253 also will be discussed in further detail below with respect to melt redistribution element 453 of FIG. 4. Manifold 212 is heated by a manifold heater 228.

Nozzles 230 are received in openings 232 in a mold plate 221. Nozzles 230 are heated by heaters 236. Each nozzle 230 includes a nozzle channel 234 for receiving melt from a respective outlet of manifold channel 214 and delivering the melt through a mold gate 238 to a respective mold cavity 240. Mold cavities 240 are provided between cavity mold plate 224 and a mold core 225. Cooling channels 242 are provided to cool mold cavities 240.

According to an embodiment of the invention, manifold 212 is a two-level manifold for a multi-cavity injection molding apparatus. However, an injection molding apparatus may have a manifold with any number of channels leading to any number of cavities wherein a shear stress profile of a melt flow within a channel is imbalanced.

Figure 3:
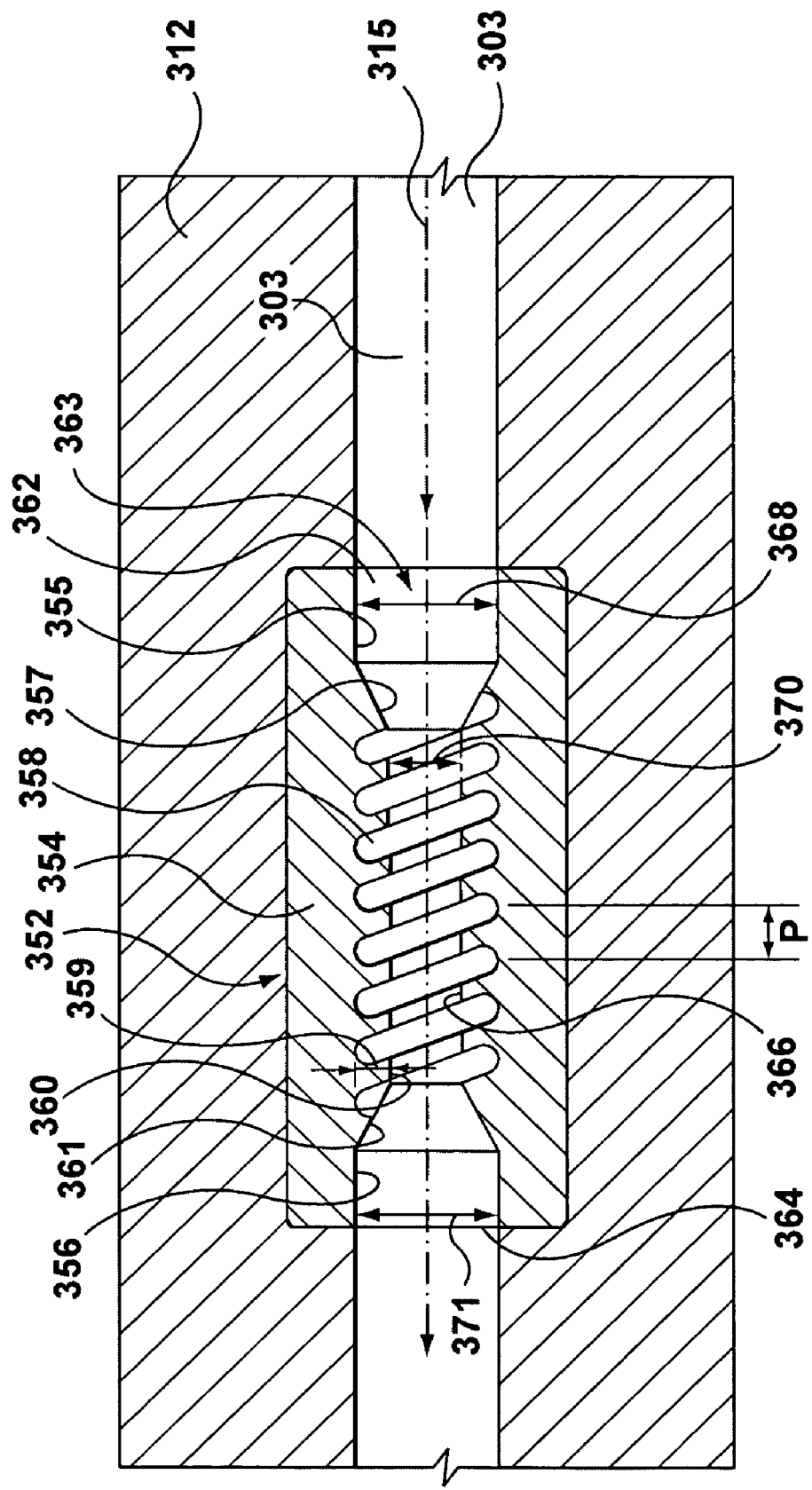
FIG. 3 is an enlarged view of a portion of FIG. 2.

Melt redistribution element 252 according to an embodiment of the current invention is illustrated in more detail in FIG. 3 as melt redistribution element 352. Melt redistribution element 352 is located, in one embodiment of the invention, in a manifold 312 having a melt channel 303 therein. Melt redistribution element 352 is coaxial with manifold melt channel 303 along central axis 315. Melt redistribution element 352 includes a body portion 354 and a central melt bore 363. Melt bore 363 has an inlet 362 and an outlet 364. Melt bore 363 includes a first bore section 355, an inlet tapered section 357, a second bore section 366, an outlet tapered section 361 and a third bore section 356. The melt redistribution element 352 also includes a helical melt pathway 358 formed into body portion 354 along a surface 360 of second bore section 366. Helical melt pathway 358 also includes a depth 359 measured from surface 360 of second bore section 366. The angle of the helical melt pathway, the pitch or the density of the helical turns, and distance 359 may be varied depending upon the application for which melt redistribution element 352 is being used. The melt travels to inlet 362 through manifold melt channel 303 having accumulated a nonsymmetrical or uneven shear stress cross-sectional profile, depending on the location of element 352. From inlet 362, the melt moves through first bore section 355 having a first diameter 368. First diameter 368 is generally the same as a diameter of manifold melt channel 303. First bore section 355 is generally aligned flush with channel 303. Melt then travels through inlet tapered section 357. Inlet tapered section 357 has a gradually reducing diameter.

As the melt flows into inlet tapered section 357, the pressure of the melt increases and thus the melt applies an increased pressure against second bore section 366. This higher pressure forces the melt to flow at a higher velocity through melt redistribution element 352. While a central portion of the melt flows unobstructed through second bore section 366, an outer portion of the melt, having an uneven cross-sectional shear stress profile, is forced to follow helical melt pathway 358 that reorients the outer shear stress profile and makes it more evenly distributed. Also, the outer melt portion may be partially mixed with the central portion of the melt stream flowing unobstructed through second bore section 366 of melt redistribution element 352. Depending on the application, the injection molding processing conditions, and the type of the melt, the melt redistribution element 352 may have a single or several helical melt pathways 358 of similar or different geometries. Unlike other melt mixers or flippers known in the art that have a mechanical obstruction or bullet therein requiring the melt to split and flow around the obstruction, redistribution element 352 allows the melt to flow unobstructed, which provides an additional advantage in color change applications. Unobstructed flow prevents the accumulation of melt and the formation of so-called "dead spots" where melt is trapped and does not flow.

Melt material then enters second bore section 366, which has a second diameter 370 which is smaller than first diameter 368. At the end of helical melt pathway 358, melt material enters outlet tapered section 361, which has a gradually increasing diameter. Melt then flows into third bore section 356 which has a diameter 371 about equal to diameter 368 of first bore section 355 and to a diameter of manifold melt branch 303. Third bore section 356 is also generally flush with branch 303 at outlet 364.

Figure 3A:
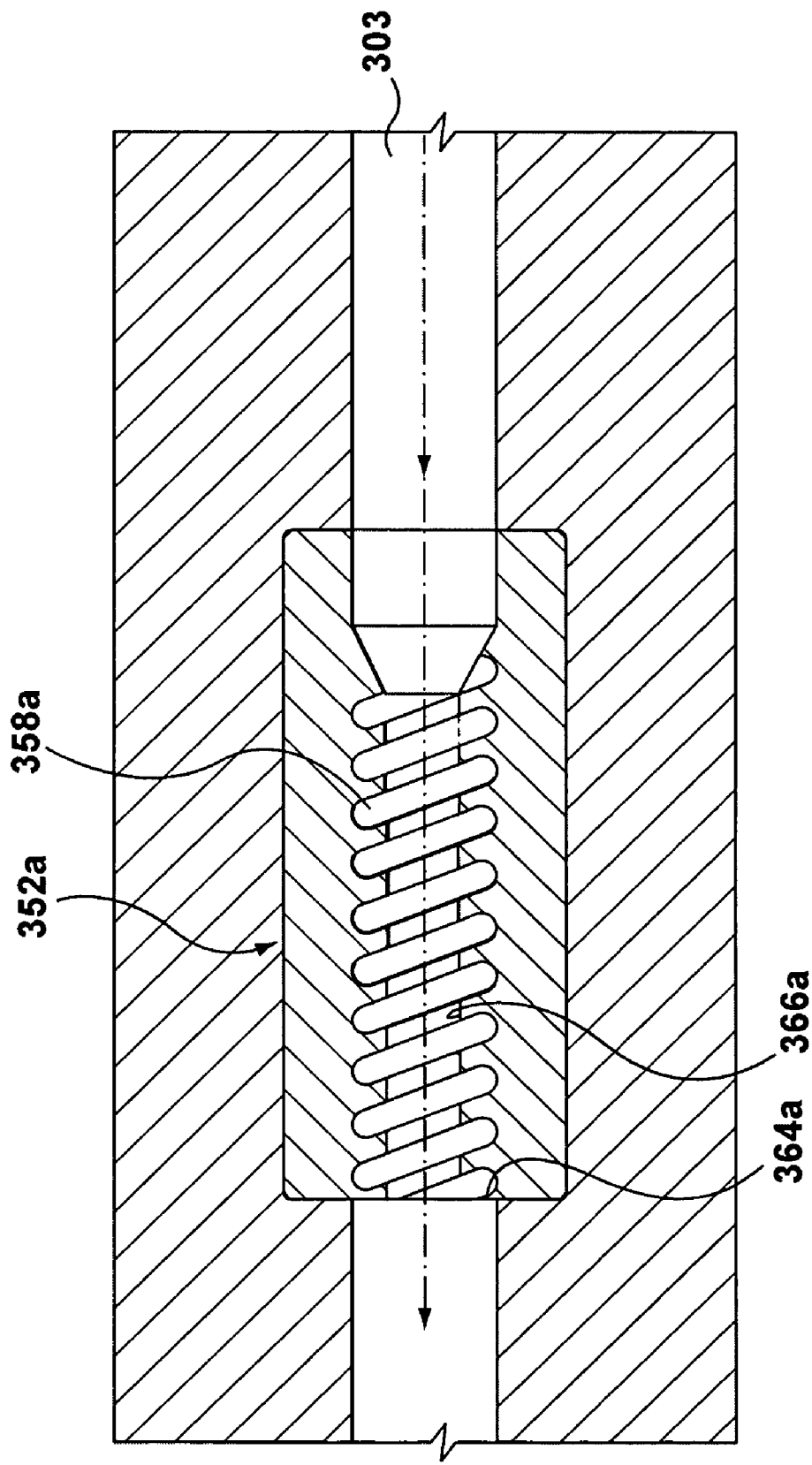
FIG. 3A is an alternative enlarged view of the portion of FIG. 2 illustrated in FIG. 3.
Figure 3B:
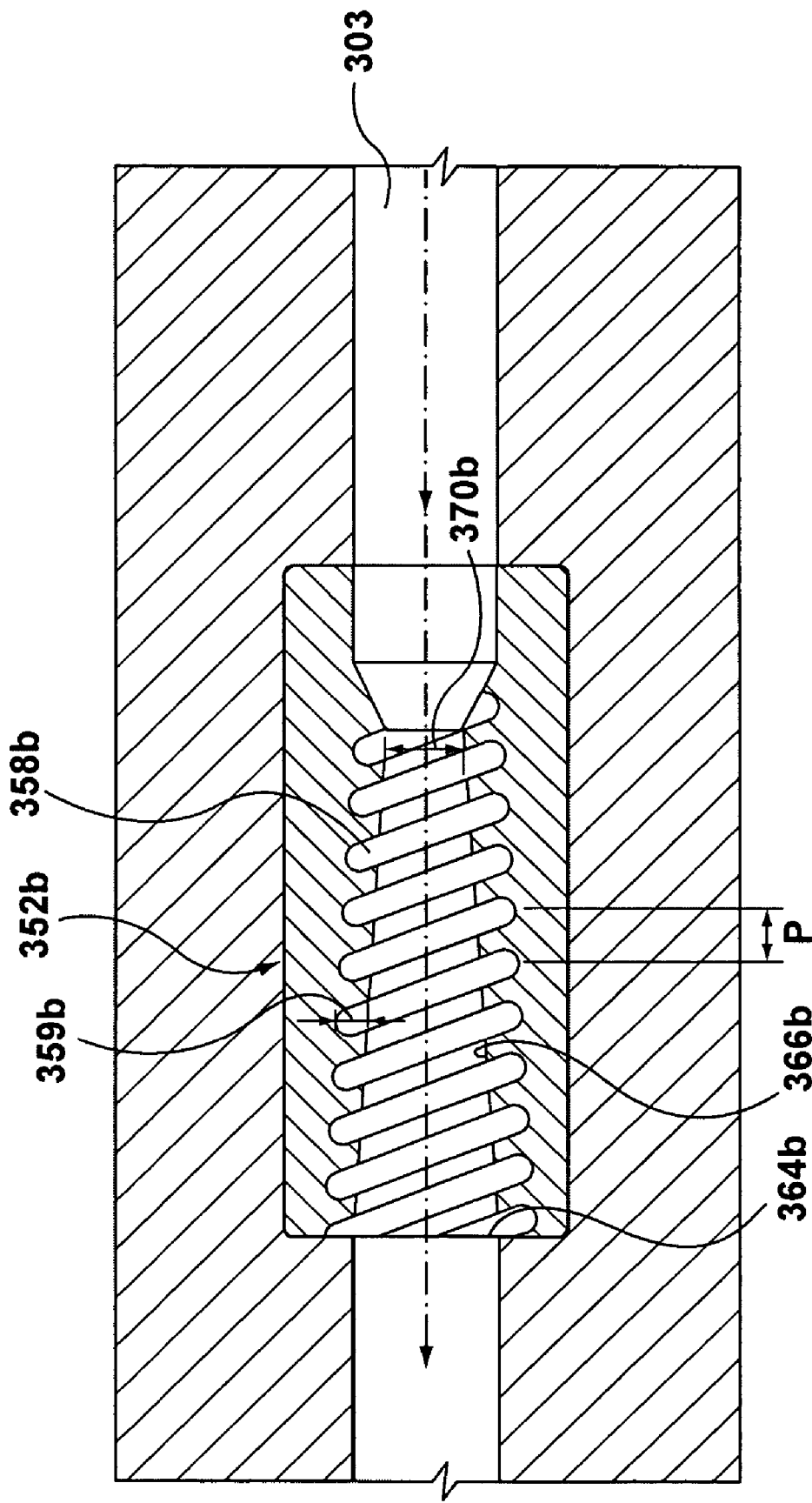
FIG. 3B is another alternative enlarged view of a portion of FIG. 2 illustrated in FIG. 3.
Figure 3C:
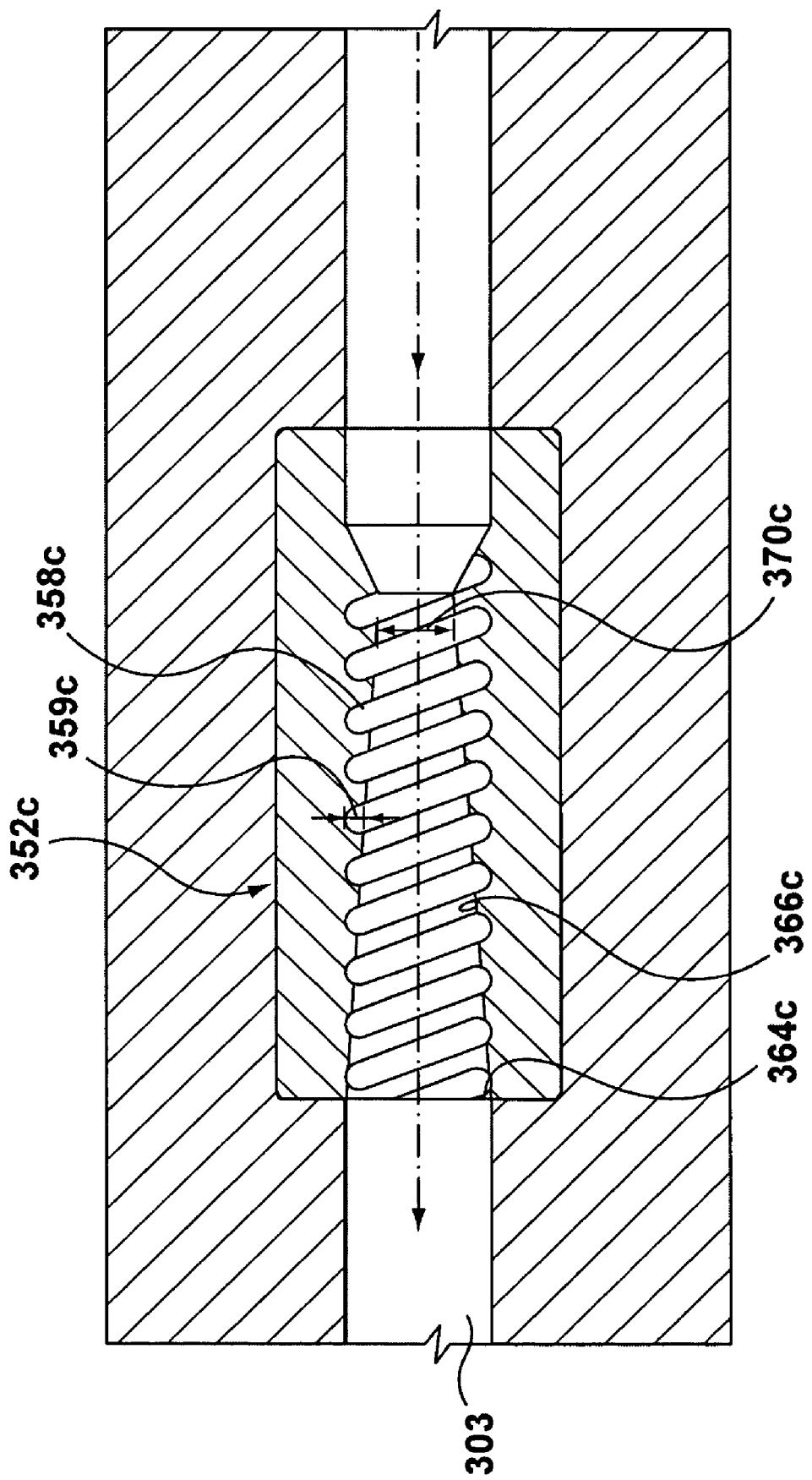
FIG. 3C is another alternative enlarged view of a portion of FIG. 2 illustrated in FIG. 3.

FIG. 3A illustrates an alternative melt redistribution element 352a. Melt redistribution element 352a is similar to melt redistribution element 352 except that it does not feature outlet tapered section 361. Instead, helical melt pathway 358a and second bore section 366a end abruptly at outlet 364a. FIG. 3B illustrates yet another alternative melt redistribution element 352b. Melt redistribution element 352b is also similar to melt redistribution element 352a in that it does not feature outlet tapered section 361. Also, the diameter 370b of second bore section 366b gradually increases in the downstream direction such that the diameter of second bore section 366b at outlet 364b is substantially the same as the diameter of melt channel 303 at outlet 364b. Since depth 359b of helical melt pathway 358b is constant over the length of second bore section 366b, the turns of helical melt pathway 358b become gradually larger in the downstream direction. FIG. 3C illustrates another alternative melt redistribution element 352c. Melt redistribution element 352c is similar to melt distribution element 352b, in that it does not have outlet tapered section 361 and diameter 370c of second bore section 366c gradually increases in the downstream direction as described with reference to element 352b. However, depth 359c of helical melt pathway 358c is not constant along the length of second bore section 366c. Instead, depth 359c of helical melt pathway 358c becomes gradually smaller in the downstream direction such that the outer diameter of helical melt pathway 358c at outlet 364c is substantially the same as and aligned with the diameter of melt channel 303 at outlet 364c.

Melt redistribution element 352, or any of the melt redistribution elements disclosed herein, may be made from two or more blocks, which when placed together form either a cylindrical-shaped or a square-shaped insert or plug. For example, a melt redistribution element 352 made from two blocks may have a portion of melt bore 363 machined into each block. The two blocks are then positioned adjacent one another to obtain the overall shape of melt redistribution element 352. The blocks may be brazed, welded, bonded, or otherwise fused together or may be mechanically held together, such as by clamping, etc. Alternatively, two or more blocks may be received within a recess or bore made in a manifold or a manifold plug, as discussed in more detail below, such that the positioning of the blocks and thermal expansion due to heating of the manifold could be used to hold the two the blocks together. In another embodiment, melt redistribution element 352 may be cast, such that melt bore 363 is formed within a block. In another embodiment, one skilled in the art can appreciate a complex boring process may be used to form melt bore 363 of melt redistribution element 352 within a single block. In yet another embodiment, melt bore 363 of melt redistribution element 352 may be formed along with, and as part of, a portion of manifold channel, such as manifold channel 214 of FIG. 2.

Figure 4:
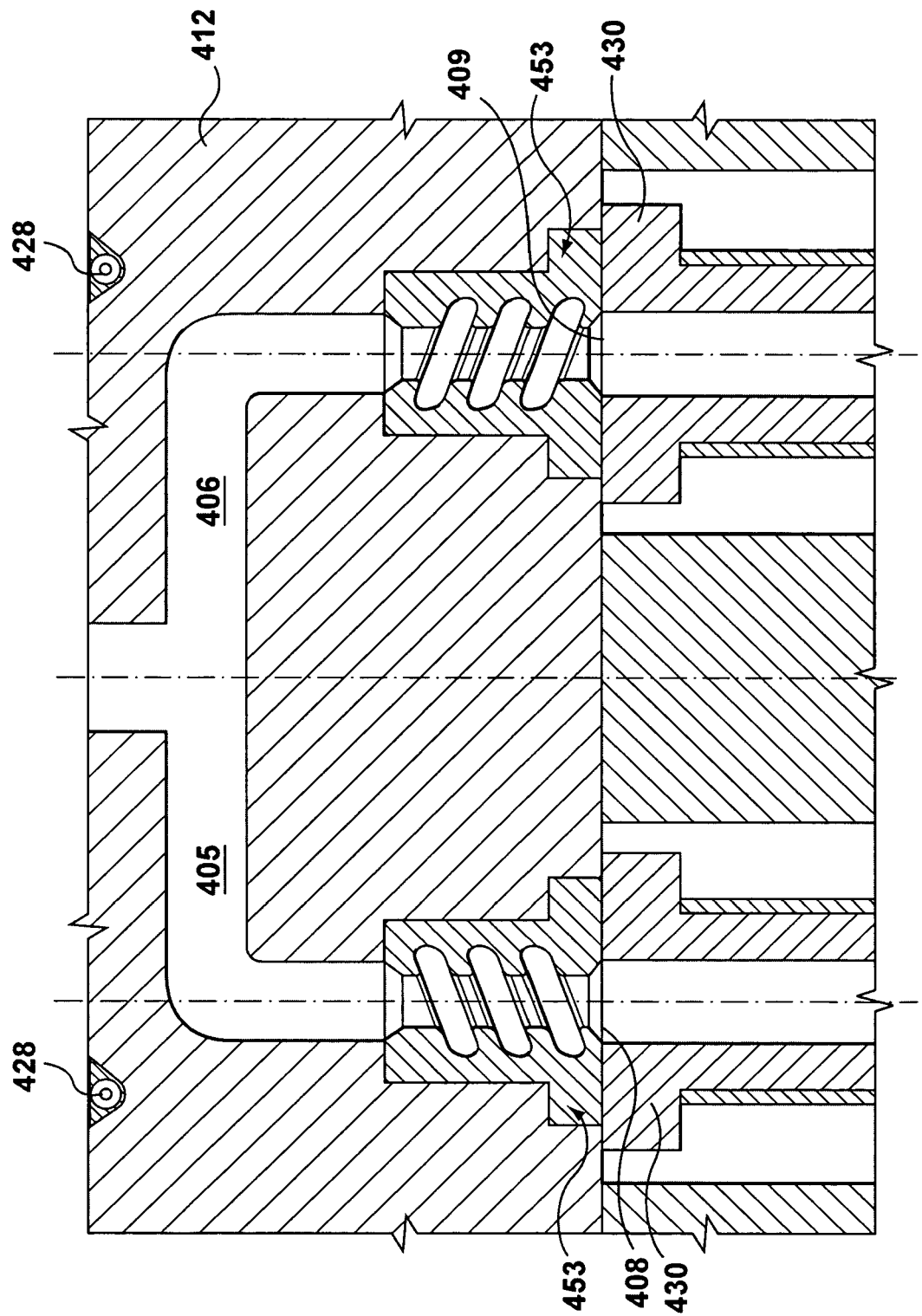
FIG. 4 is an enlarged view of a portion of FIG. 2.

According to another embodiment of the invention, melt redistribution elements 453 are shown in FIG. 4 disposed between the two-level manifold 412, similar to manifold 212 of FIG. 2, and nozzles 430. Both redistribution elements 453 are the same and communicate with branches 405 and 406 of manifold 412, respectively. One skilled in the art will appreciate that other melt redistribution elements 453 may be provided in manifold 412 having a plurality of manifold outlets. Melt redistribution elements 453 operate identically to melt redistribution element 352 discussed in detail above. Also, the internal structure of melt redistribution elements 453 are similar to that discussed above with respect to melt redistribution element 352. Similarly, melt redistribution elements 453, or any of the melt redistribution elements disclosed herein, may have an internal structure similar to those described above with respect to any of melt redistribution elements 352a, 352b and 352c of FIGS. 3A-3C.

The external structure of redistribution elements 453, however, are particularly adapted for easy installation at outlets 408 and 409 of manifold 412. Melt redistribution elements 453 can be press-fit, shrink-fit, brazed or threaded into manifold 412. Melt redistribution elements 453 according to this embodiment can be also used to retrofit existing manifolds as they are very easy to install, align, clean and eventually replace after a lengthy service.

Melt redistribution elements 453 can be added downstream of redistribution elements 352. Also, "annular flow," where melt flows around an inserted device, for example a torpedo, positioned within a channel, is prevented. Because the melt does not split, flow lines are not created in the melt stream using melt redistribution elements 453.

The melt redistribution elements disclosed herein, such as elements 453, may be made of various materials, such as carbides and stainless steel that provide wear resistance in case glass-filled and other abrasive melt materials are used. In other applications, the redistribution elements, such as melt redistribution elements 453, are made of high, thermally-conductive materials, such as copper and copper alloys. In particular, melt redistribution elements 453, if located in the proximity of the manifold heater 428 as illustrated in FIG. 4, will improve the heat transfer to a nozzle head.

Figure 5:
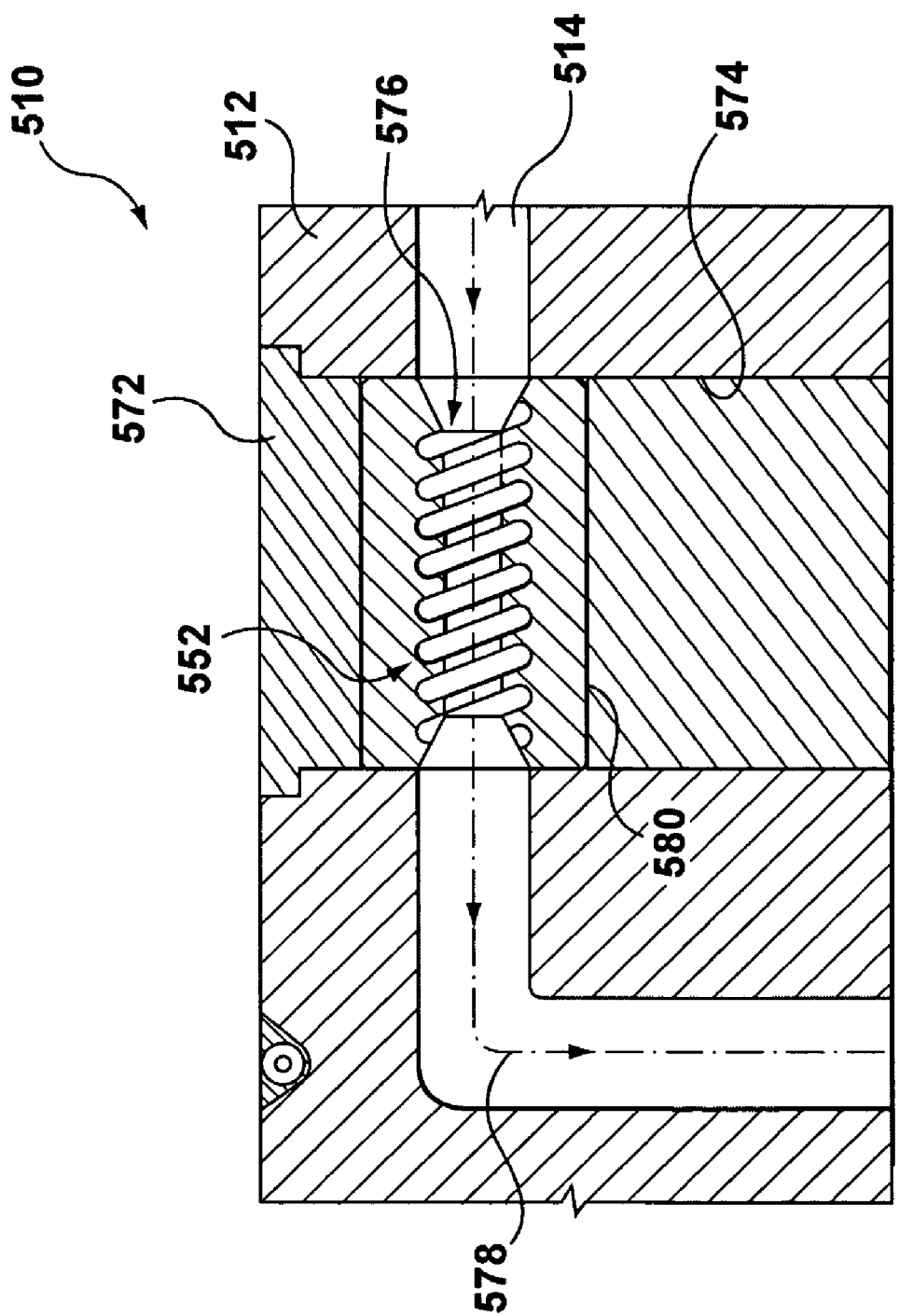
FIG. 5 is an enlarged view of a portion of another embodiment of an injection molding apparatus according to the present invention.

A portion of another embodiment of the invention is shown in an injection molding apparatus 510 illustrated in FIG. 5. Although only a portion of the apparatus 510 is shown, it will be appreciated that the apparatus 510 is generally similar to apparatus 210 of FIG. 2. In injection molding apparatus 510, a manifold plug 572 is received in a bore 574, which is provided in a manifold 512. Plug 572 allows a melt redistribution element 552 to be inserted more easily within a melt channel 514 of single piece manifold 512. Plug 572 includes a melt channel 576 that extends therethrough along a flow axis 578. Melt redistribution element 552 is received in a bore 580 of the plug 572. Melt redistribution element 552 is similar or equivalent in function and structure to those described above for melt redistribution elements 352, 352a, 352b or 352c, shown in FIGS. 3 and 3A-3C.

Figure 5A:
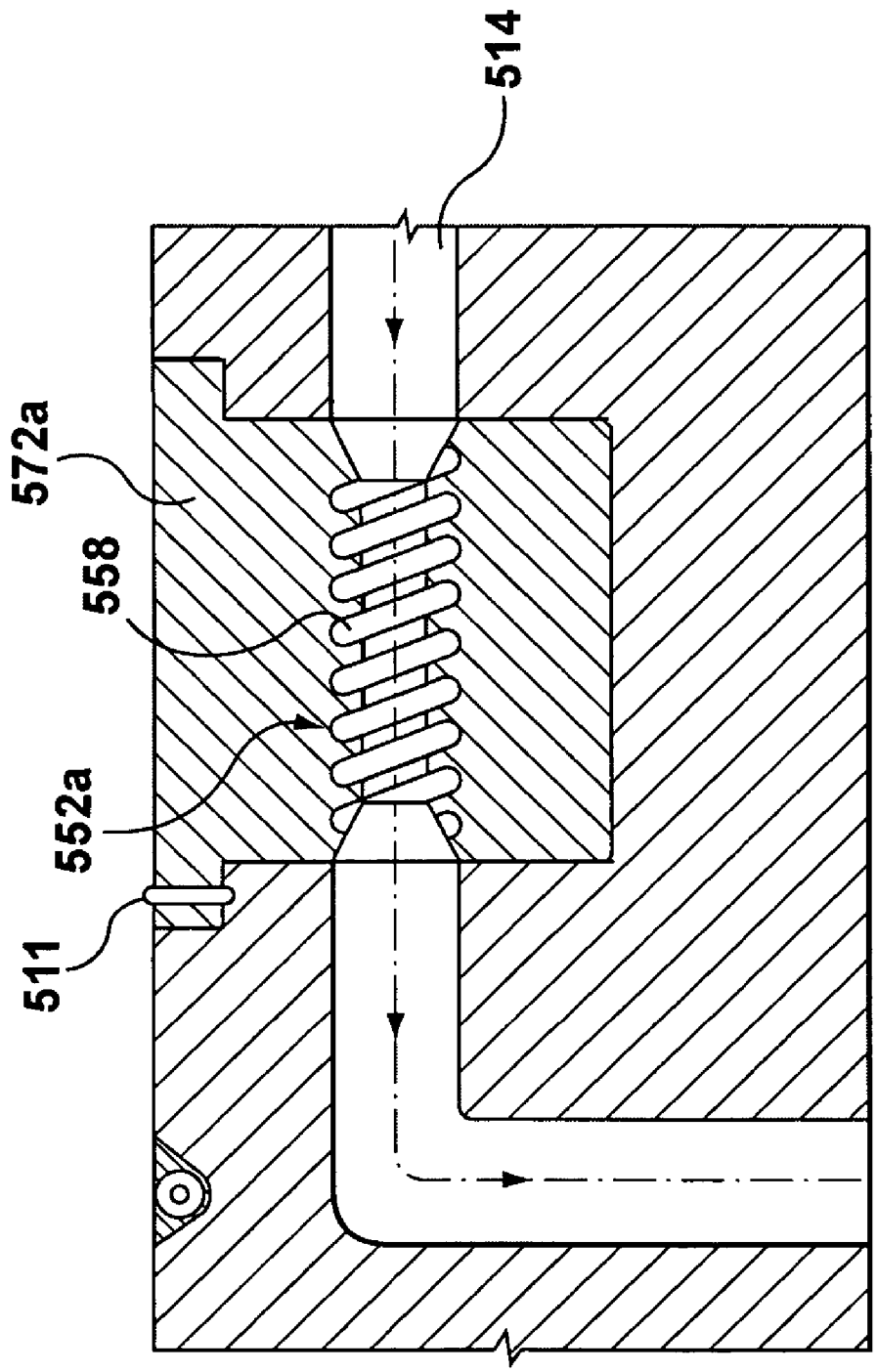

In another embodiment of the invention, melt redistribution element 552a is formed as a portion of manifold plug 572a and is illustrated in FIG. 5A. In this arrangement, helical melt pathway 558 is cut into, or formed as an integral part of, the manifold plug 572a. The melt redistribution element 552a is oriented with respect to the melt channel 514 using a dowel 511 or other fastener, such as a bolt.

FIG. 6 illustrates another embodiment of an injection molding apparatus 610, having a one-level manifold 612. Manifold 612 includes a manifold channel 614 with at least two branches 603a and 603b, yet still imbalances occur such that a melt redistribution element 652 is useful. Alternatively, manifold 612 may be a two-level manifold similar to that described above with respect to manifold 212 of FIG. 2.

In the embodiment of FIG. 6, melt redistribution element 652 is placed within the manifold prior to assembling the manifold in its final form. Manifold 612 is a split manifold having a first manifold plate 644 and a second manifold plate 646. Recesses 648, 650 are provided in first manifold plate 644 and second manifold plate 646, respectively, for receiving melt redistribution element 652. Manifold plates 644, 646 are welded, fused, brazed, bonded or otherwise fused together, for example as described in U.S. Pat. No. 4,648,546, which is herein incorporated by reference in its entirety. Alternatively, plates 644, 646 may be connected or positioned together by another manner apparent to one skilled in the art. For example, they may be mechanically clamped or positioned with close tolerances within injection molding apparatus 610 so as to have the effect of being fused. Although only one melt redistribution element 652 is shown in branch 603a, it will be appreciated by a person skilled in the art that a melt redistribution element may be provided in each of branches 603a and 603b of the manifold channel 614. In FIG. 6A, melt redistribution element 652a is located in the manifold melt channel 603a with no need to form recess in the manifold body. Because of its fit entirely within melt channel 603a, melt redistribution element 652a does not include first bore section 355 or third bore section 356, as illustrated in melt redistribution element 352 of FIG. 3. A locating dowel 611 or other fastener, is used to retain the redistribution element in a fixed position.

Figure 7:
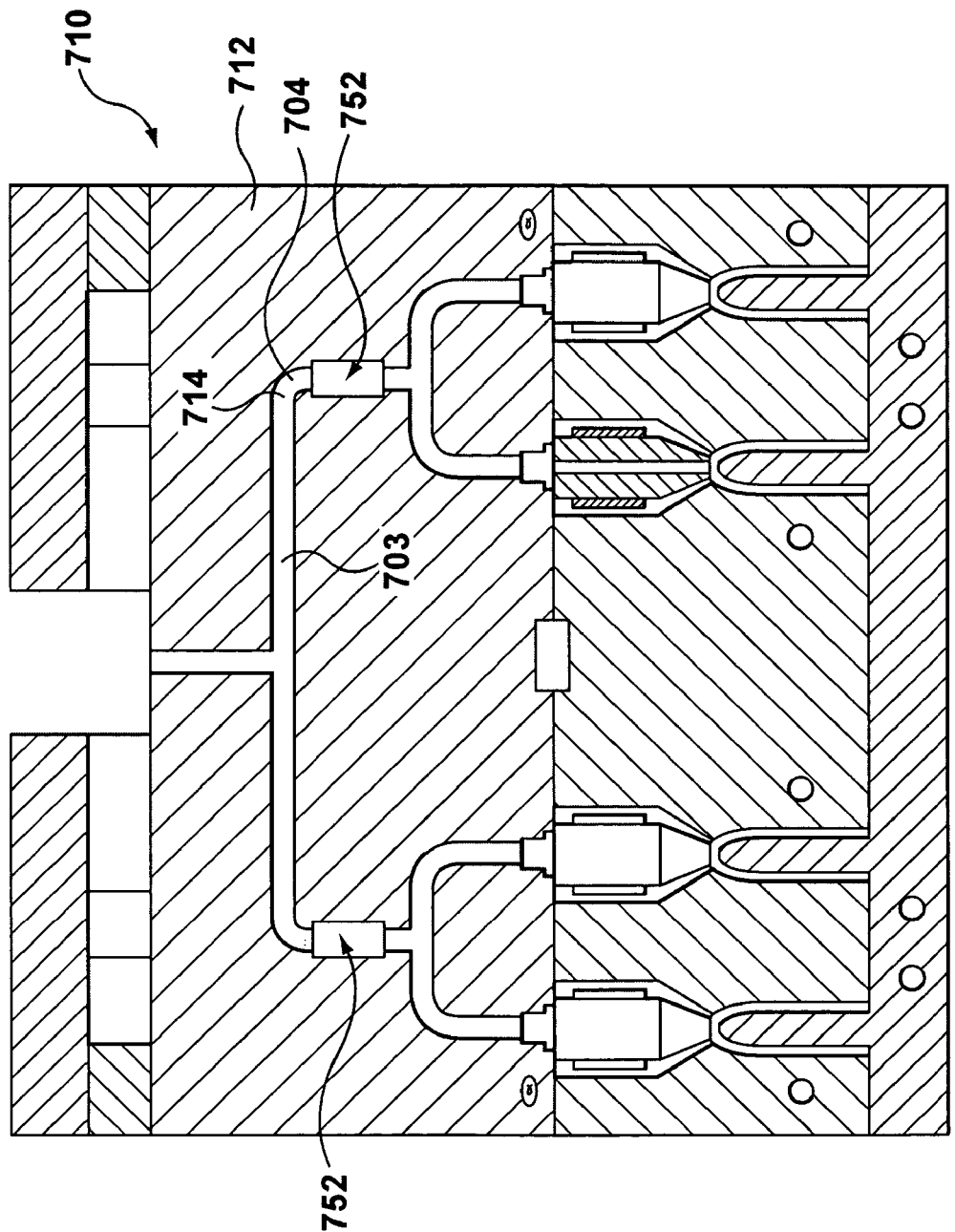
FIG. 7 is a side sectional view of another embodiment of an injection molding apparatus according to the present invention.
Figure 8:
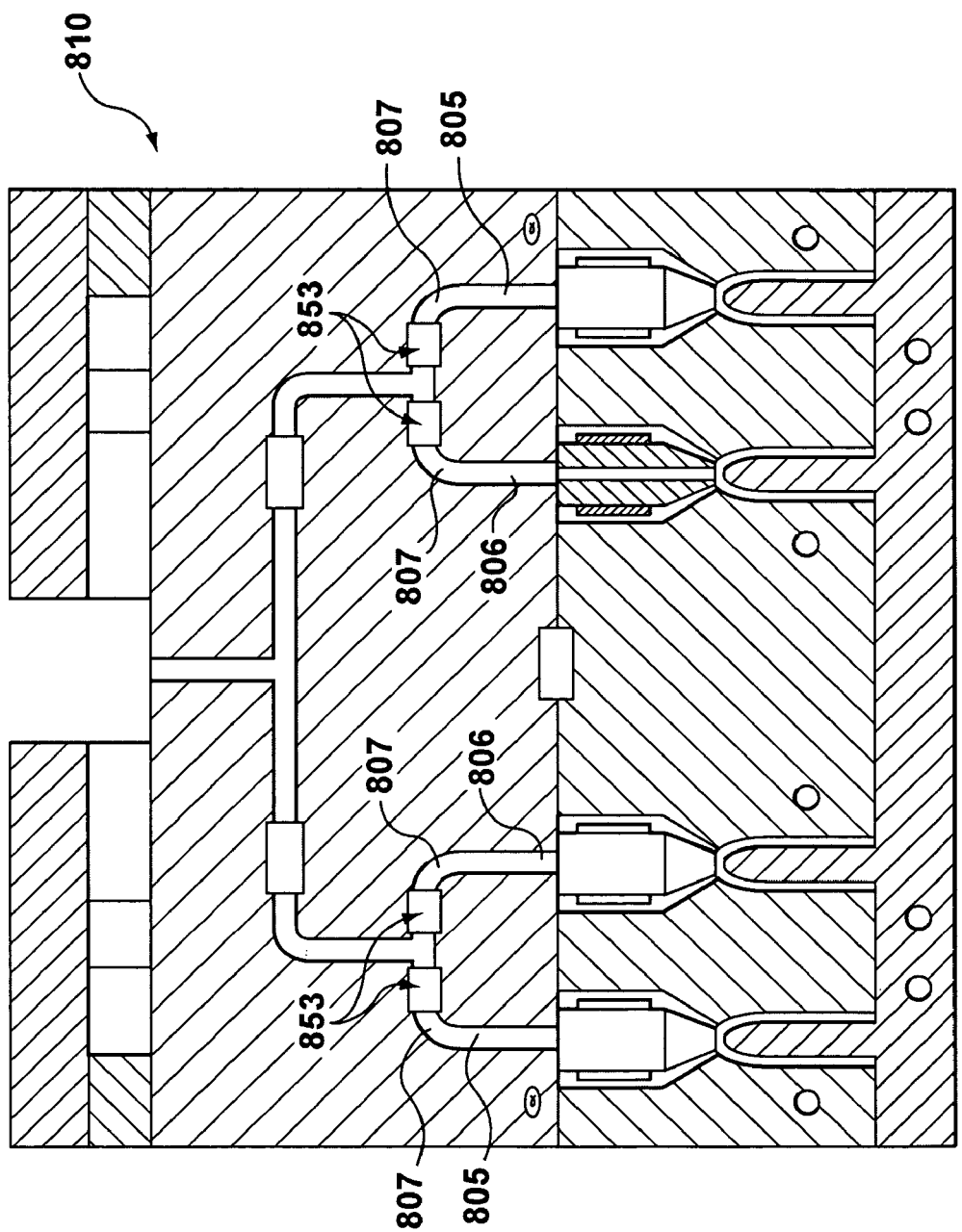
FIG. 8 is a side sectional view of another embodiment of an injection molding apparatus according to the present invention.

Although melt redistribution elements are shown in FIGS. 2, 4 and 6 in distinct locations, one skilled in the art can appreciate that they may appear in a variety of positions along a manifold melt channel. For example, in a manifold 712 of an injection molding apparatus 710, as illustrated in FIG. 7, melt redistribution element 752 is instead positioned within branch 703 of a melt channel 714 downstream of turn 704. In this position, melt redistribution element 752 will redistribute any shear imbalance that may have generated in a melt stream from such a turn. Likewise, as shown in an injection molding apparatus 810 of FIG. 8, melt redistribution elements 853 may be positioned anywhere within branches 805 and 806, such as upstream of turns 807.

Figure 9:
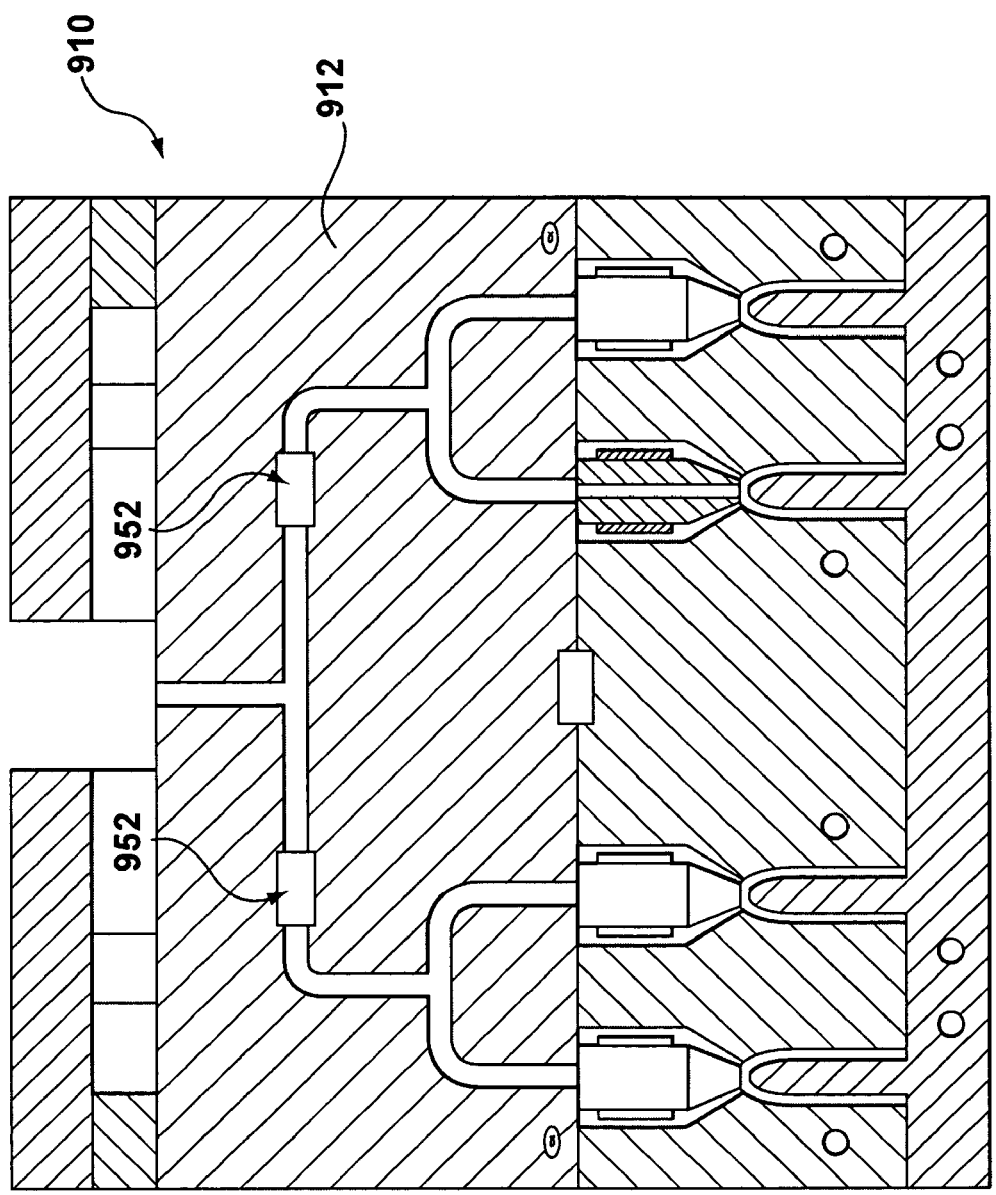
FIG. 9 is a side sectional view of a portion of another embodiment of an injection molding apparatus according to the present invention.
Figure 10:
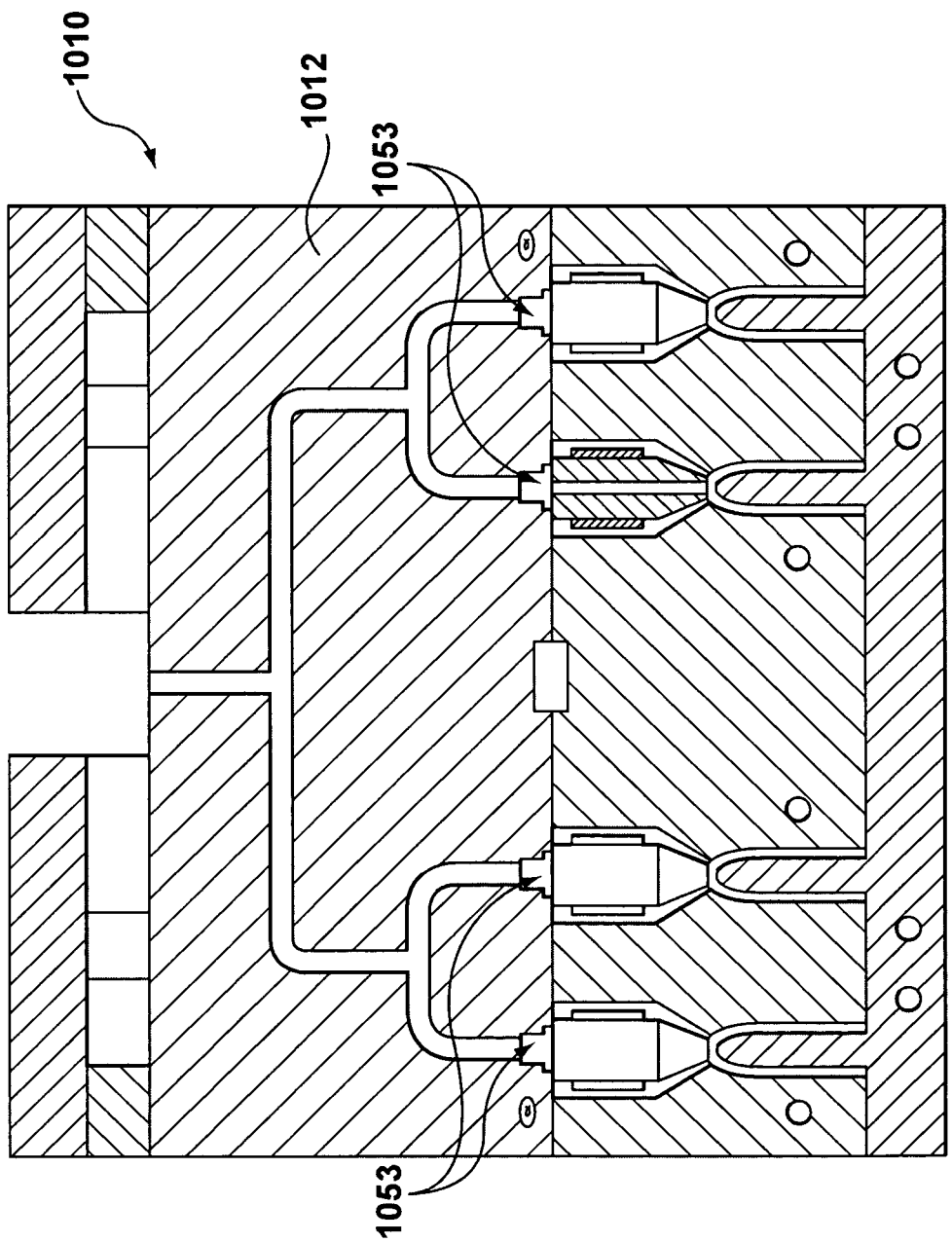
FIG. 10 is a side sectional view of another embodiment of an injection molding apparatus according to the present invention.

FIG. 9 shows yet another injection molding apparatus 910 wherein only melt redistribution elements 952 are present within a manifold 912. Likewise, FIG. 10 shows an injection molding apparatus 1010 wherein only melt redistribution elements 1053 are present within a manifold 1012. Since the different melt redistribution elements, such as melt redistribution element 952 of FIG. 9 and melt redistribution element 1053 of FIG. 10, serve different purposes within a two-level manifold, one skilled in the art can appreciate that only one may be useful in a particular manifold design. Melt redistribution elements 752, 853, 952 and 1053 are not illustrated in detail because any of the melt redistribution elements disclosed herein are suitable for use in the positions as illustrated in FIGS. 7-10.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   an injection manifold having a manifold inlet for receiving a melt stream of moldable material under pressure, a plurality of manifold melt channels and a plurality of melt channel outlets; and
   a melt redistribution element in fluid communication with one of said plurality of manifold channels, said melt redistribution element including an inlet and an outlet, wherein said melt redistribution element includes a melt bore pathway from said inlet to said outlet, the melt bore pathway being unobstructed from said inlet to said outlet, and a helical melt pathway formed around at least a portion of said melt bore pathway.

2. The injection molding apparatus of claim 1, wherein said redistribution element includes an inlet tapered section positioned between said inlet and said helical melt pathway, wherein said inlet tapered section has a gradually decreasing diameter.

3. The injection molding apparatus of claim 1, wherein a central portion of the melt stream flows through the melt bore and an outer portion of the melt stream flows through the helical melt pathway.

4. The injection molding apparatus of claim 1, wherein said melt stream exiting said melt redistribution element has a more uniform cross-sectional profile of at least one parameter selected from the group consisting of temperature, viscosity, shear-stress, velocity and pressure than said melt stream entering said melt redistribution element.

5. The injection molding apparatus of claim 1, wherein said melt redistribution element includes an outlet tapered section positioned between said helical melt pathway and said outlet of said melt redistribution element, wherein said outlet tapered section has a gradually increasing diameter.

6. The injection molding apparatus of claim 1, wherein said melt bore further comprises a first bore section having a first bore diameter about equal to a channel diameter of said manifold channel and a second bore section with a second bore diameter that is less than said first bore diameter.

7. The injection molding apparatus of claim 1, wherein a depth of said helical melt pathway measured from a surface of said melt bore is constant along said melt bore.

8. The injection molding apparatus of claim 1, wherein a depth of said helical melt pathway measured from a surface of said melt bore gradually decreases towards said outlet.

9. The injection molding apparatus of claim 1, wherein a depth of said helical melt pathway measured from said melt bore gradually decreases towards outlet.

10. The injection molding apparatus of claim 1, wherein said manifold includes a first manifold plate and a second manifold plate and wherein said melt redistribution element is positioned between said first and second manifold plates.

11. The injection molding apparatus of claim 10, wherein said melt redistribution element is positioned within a recess formed in each of said first and second manifold plates.

12. The injection molding apparatus of claim 1, wherein said manifold includes a plug having a bore for receiving said melt redistribution element.

13. The injection molding apparatus of claim 1, wherein said manifold channel has a first turn and said melt redistribution element is placed upstream from said first turn.

14. The injection molding apparatus of claim 1, wherein said manifold channel has a first turn and said melt redistribution element is placed downstream from said first turn.

15. The injection molding apparatus of claim 1, wherein said manifold channel has a first turn and a second turn and said melt redistribution element is placed downstream of said first turn and upstream of said second turn.

16. The injection molding apparatus of claim 1, wherein said manifold channel has a first turn and a second turn and said melt redistribution element is placed downstream of said second turn.

17. The injection molding apparatus of claim 1, wherein said manifold channel includes a split into two branches and said melt redistribution element is placed downstream of said split.

18. The injection molding apparatus of claim 1, wherein said melt redistribution element communicates with said manifold channel just upstream of said manifold outlet.

19. The injection molding apparatus of claim 1, wherein said manifold channel includes more than one melt redistribution element.

20. The injection molding apparatus of claim 1, wherein said melt redistribution element is maintained in position within said manifold channel via a fastener.

21. A method for redistributing a melt stream within a manifold of an injection molding apparatus, comprising:
   allowing a central portion of the melt stream to flow unobstructed along an axis of a manifold channel; and
   allowing an outer portion of the melt stream to flow along a helical path around said central portion, wherein said axis is parallel to the melt upstream of said helical path.

22. The method of claim 21, wherein the axis is coaxial with the melt stream upstream of the helical path.

23. The method of claim 21, farther comprising the step of providing a melt redistribution element having an inlet, an outlet, and a longitudinal axis, wherein the longitudinal axis of the melt redistribution element is parallel to the axis of the central portion and wherein the flow along the helical path is within the melt redistribution element.

24. The method of claim 23, wherein the central portion of the melt stream flows along the axis from the inlet to the outlet of the melt redistribution element.

25. A method for redistributing a melt stream within a manifold of an injection molding apparatus, comprising:

providing a melt redistribution element in the manifold, the melt redistribution element having an inlet and an outlet; and passing the melt stream through said melt redistribution element such that a central portion of the melt stream passes unobstructed from said inlet to said outlet and an outer portion of the melt stream flows helically around at least a portion of said central portion such that the melt stream has a more uniform profile at said outlet of said melt redistribution element than at said inlet of said melt redistribution element.

26. The method of claim 25, wherein the central portion of said melt stream from said inlet to said outlet has a longitudinal axis that is parallel to a longitudinal axis of the melt redistribution element.

27. The method of claim 26, wherein the longitudinal axis of the central portion from said inlet to said outlet and the longitudinal axis of the melt redistribution element are coaxial.

28. The method of claim 25, wherein the melt redistribution element is provided after a bend or split in a melt channel of the manifold.

29. The method of claim 25, wherein the step of passing the melt stream through said melt redistribution element further comprises increasing the pressure of the melt stream between the inlet of the melt redistribution element and the helically flowing melt stream.

30. An injection molding apparatus comprising:
an injection manifold having a manifold inlet for receiving a melt stream of moldable material under pressure, and a manifold melt channel; and
a melt redistribution element in fluid communication with said manifold channel, said melt redistribution element including an inlet and an outlet, wherein said melt redistribution element includes a melt bore pathway having a longitudinal axis from said inlet to said outlet that is parallel to a longitudinal axis of the melt redistribution element, and a helical melt pathway formed around at least a portion of said melt bore pathway.

31. The injection molding apparatus of claim 30, wherein the longitudinal axis of the melt bore pathway from said inlet to said outlet is coaxial with the longitudinal axis of the melt redistribution element.

32. The injection molding apparatus of claim 30, further comprising an injection molding nozzle coupled to the manifold, the injection molding nozzle including a nozzle melt channel for receiving the melt stream from the manifold and delivering the melt stream to a mold cavity.

33. The injection molding apparatus of claim 30, wherein said manifold includes a plurality of manifold channels having outlets, and wherein a plurality of injection molding nozzles including nozzle melt channels are coupled to said manifold for receiving said melt stream from said outlets and delivering the melt stream to at least one mold cavity.

34. The injection molding apparatus of claim 33, further comprising a heater coupled to said manifold and heaters coupled to said nozzles.

35. The injection molding apparatus of claim 1, farther comprising a plurality of injection molding nozzles including nozzle melt channels coupled to said manifold for receiving said melt stream from said outlets.

36. The injection molding apparatus of claim 35, further comprising a heater coupled to said manifold and heaters coupled to said nozzles.

37. The injection molding apparatus of claim 35, wherein said melt redistribution element communicates with said manifold channel just upstream of one of said nozzles.

* * * * *